(No Model.)

C. W. DAVISON.
PROTECTIVE SEAL FOR BICYCLES.

No. 605,054. Patented May 31, 1898.

Witnesses:
C. E. Van Dorn
M. E. Cooley

Inventor:
Charles Wright Davison,
By Paul Hawley
his attorneys.

UNITED STATES PATENT OFFICE.

CHARLES WRIGHT DAVISON, OF MINNEAPOLIS, MINNESOTA, ASSIGNOR TO FREEMAN P. LANE, OF SAME PLACE.

PROTECTIVE SEAL FOR BICYCLES.

SPECIFICATION forming part of Letters Patent No. 605,054, dated May 31, 1898.

Application filed May 5, 1897. Serial No. 635,167. (No model.)

*To all whom it may concern:*

Be it known that I, CHARLES WRIGHT DAVISON, of the city of Minneapolis, county of Hennepin, State of Minnesota, have invented certain new and useful Improvements in Protective Seals for Bicycles, of which the following is a specification.

My invention relates to means for protecting bicycles against theft or loss; and the object of the invention is to provide a seal which when once attached to a bicycle cannot be removed without dismembering the frame and disfiguring the wheel; and a further object of the invention is to provide a bicycle-seal which will show on its face the number of the wheel and the name of the owner or other identifying mark, which, however, are arranged beneath the transparent part, which prevents their removal without breaking and disfiguring the wheel in such a manner that it will be quickly noticed, a broken seal or the absence of a seal being evidence that the bicycle is not in the possession of the rightful owner.

My invention consists in a seal-case to be secured to the frame of the bicycle and containing a lock or latch and a frangible seal having an internal shoulder to engage with said lock or latch within said case.

My invention further consists in particular means for attaching the seal-case and in particular constructions and combinations of parts, all as hereinafter described, and particularly pointed out in the claims.

The invention will be more readily understood by reference to the accompanying drawings, forming part of this specification, and in which—

Figure 1:
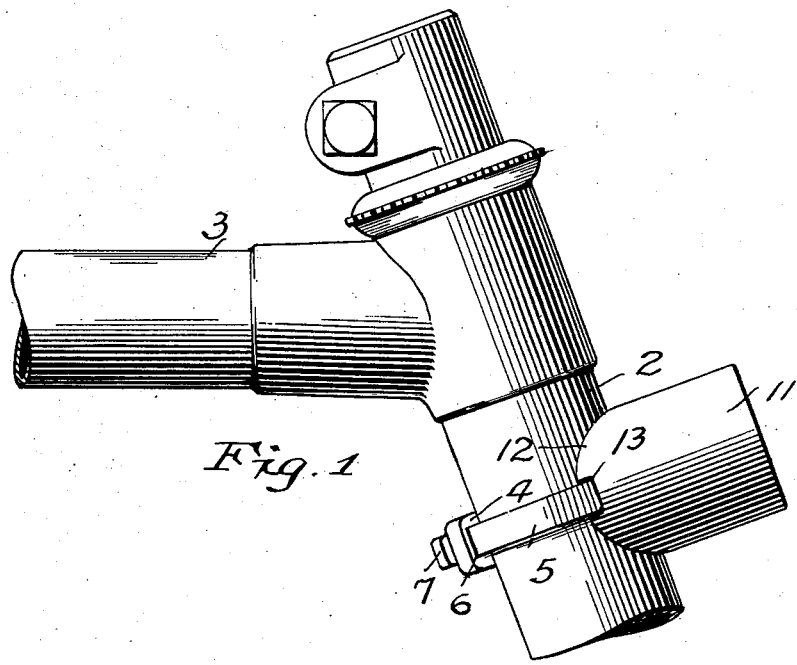
Figures 2, 3:
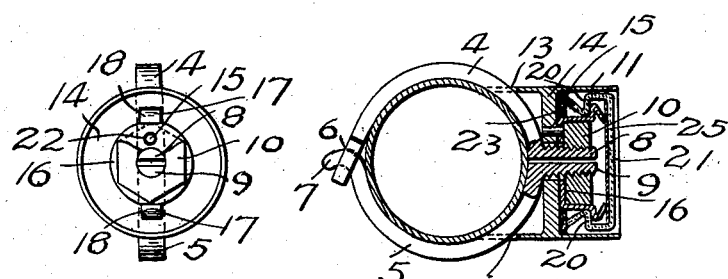
Figures 4, 5:

Figure 1 shows a portion of a bicycle-frame with a protective seal embodying my invention attached thereto. Fig. 2 is a cross-section on the line *x x* of Fig. 1. Fig. 3 is a front view of the device. Fig. 4 is a perspective view of the lock or latch, and Fig. 5 is an enlarged view of the paper seal used within the glass seal.

As shown in the drawings, 2 represents the head or front portion of a bicycle.

3 is the top bar of the frame.

At a point between the top bar and the lower bar and on the head 2 I place the seal device. This comprises the semicircular ring-sections 4 and 5, one of which is provided with an eye 6 and the other with a hook 7, to be secured therein. At the opposite ends of the sections the short arms 8 and 9, belonging to the parts 4 and 5, respectively, are each provided with a half of a screw-thread, so that when they are brought together they make a screw to receive the nut 10.

11 represents a tubular casing the end 12 of which conforms to the sides of the head 2 and is provided with notches 13 for the ring. This casing is provided with a bottom or partition 14, having a hole to admit the screw-sections 8 and 9, and provided with a pin or lug 15. Within the casing or box, the outer end of which is of considerable depth, I arrange the ring 16, stamped from sheet metal and provided with the latch-arms 17, each of which has a hook 18, the shoulder 19 of which springs in over the shoulder 20 of the glass seal 21 when the latter is pushed into the open outer end of the box or casing. The ring 16 is placed beneath the nut and is provided with a hole 22 to admit the pin or lug 15, which prevents the pin from turning. The nut is prevented from being turned by a filling 23, of lead and emery, which is put into the bottom of the case after the nut is turned home. The nut may be smaller than shown, or if of the size shown should be provided with recesses to allow the latch-arms to spring in when the glass seal is pushed into place. The glass seal fills the recess or space within the casing and cannot be removed until it is broken. Its top is thin, so that it may be broken easily and will be transparent. Within the top of the hollow seal I arrange a round paper seal 25, which seal, as shown in Fig. 5, may be printed in several colors. For illustration, I have shown the same to bear the fictitious name "Minneapolis Cycle Insurance Co." The seal also bears the trade-mark, which is the trade-mark of the maker of the seal, and the name of the owner of the bicycle and the number of the bicycle or the insurance-policy number are conspicuous upon the card or paper and are readily seen through the glass. The sections of the ring and the case 11 are made of hardened steel, so that they cannot be attacked with ordinary tools. The thread in the nut is tapered, so that when it is turned down the two parts of the ring will be clamped so firmly about the head that they cannot be moved thereon.

The purpose of the invention is to prevent changing of wheels, disputes of ownership, and to provide evidence of ownership or evidence of theft in case bicycles are stolen.

Having thus described my invention, I claim as new and desire to secure by Letters Patent—

1. The combination, in a protective seal for bicycles, of a casing, with means for securing the same to the frame of a bicycle, a device within said casing for securing the said means, and a frangible cap or seal internally locked in said casing and covering said device, substantially as described.

2. The combination, in a protective seal for bicycles, of a casing, with means for securing the same to a bicycle, a lock provided within said casing, a frangible seal arranged in said casing and secured therein by said lock, and said seal having identification-marks, substantially as described.

3. The combination, in a protective seal for bicycles, of a casing, with means for securing the same to a bicycle, a lock provided within said casing, and a frangible seal arranged in said casing, secured therein by said lock, and, covering the same, and also covering the means for securing the casing, substantially as described.

4. The combination, with the casing and means for securing the same to the bicycle or other article, said casing being provided with a recess, of a lock or latch within said recess, and a hollow internal shouldered seal secured in said recess by said lock or latch and provided with identification-marks, substantially as described.

5. The combination, with the casing to be secured to the frame of a bicycle and having a recess or opening, of a hollow internally-shouldered glass cap or seal, provided in said recess, a lock or latch in said recess to engage the shoulder of said seal, and identification-marks provided upon the inside of said seal and visible through the top thereof, substantially as described.

6. The combination, with the casing, of the clamp having one end within said casing, a nut for securing the parts together, means to prevent the turning of the nut, and a seal to cover said nut and having identification-marks, substantially as described.

7. The combination, in a protective seal for bicycles, of the ring or clamp made of hardened material, with the casing secured thereby and also made of hardened material, and a frangible seal secured to said casing, as and for the purpose specified.

8. The combination, with the ring parts 4 and 5, of the casing, said parts being of hardened steel, means for locking the ends of said parts 4 and 5, and a frangible seal provided in said casing substantially as described.

9. The combination, of the ring parts 4 and 5, one provided with a hook and the other with an eye to receive the same, and the opposite ends of said parts 4 and 5 forming a screw, with the casing covering said screw, the nut thereon and within the casing, a lock within the casing, and a frangible seal secured within the casing by said lock, substantially as described.

10. In a protective seal for bicycles, the combination, of the clamp and the casing secured thereby, both made of hardened steel, with the glass cap provided in said casing and removable only after the cap is broken, and the marked paper provided within the seal and visible through the top thereof, substantially as described.

11. The combination, with the ring or clamp parts 4 and 5, of the casing, the nut for securing said clamp parts, the lock or latch held by said nut within said casing, means to prevent the movement of the lock, a filling to prevent the turning of the nut, and a transparent frangible seal secured in the casing by said lock and having marks within it, substantially as described.

In testimony whereof I have hereunto set my hand this 30th day of April, A. D. 1897.

CHARLES WRIGHT DAVISON.

In presence of—
C. G. HAWLEY,
M. E. GOOLEY.